Figure 1:
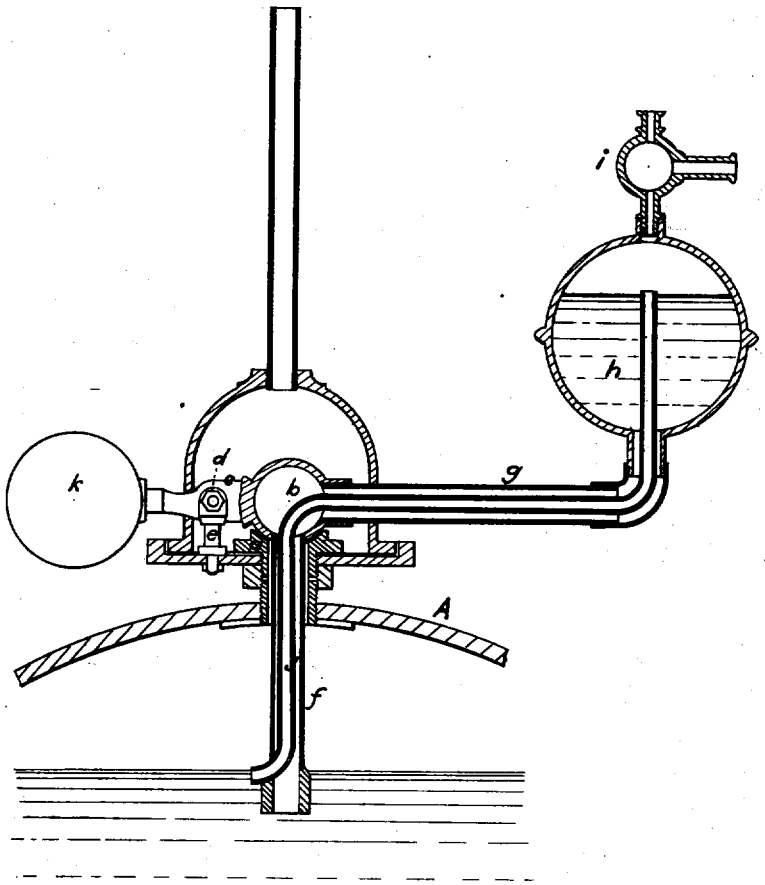

J. ABSTERDAM.

Safety-Valve.

No. 9,242. Reissued June 8, 1880.

WITNESSES.

William H. Brownrigg

Henry C. Hudson

INVENTOR.

John Absterdam By

Amos Broadus Atty

N. PETERS, PHOTO-LITHOGRAPHER, WASHINGTON, D. C.

UNITED STATES PATENT OFFICE.

JOHN ABSTERDAM, OF NEW YORK, N. Y.

SAFETY-VALVE.

SPECIFICATION forming part of Reissued Letters Patent No. 9,242, dated June 8, 1880.

Original No. 86,341, dated February 2, 1869. Application for reissue filed September 2, 1879.

*To all whom it may concern:*

Be it known that I, JOHN ABSTERDAM, of New York, in the county of New York and State of New York, have made a new and useful invention consisting of certain mechanical devices, in combination with each other and with a steam boiler or generator, of which the following is a description in such full, clear, concise, and exact terms as will enable any person skilled in the art or science to which it appertains or with which it is most nearly connected to use and make the same, reference being had to the accompanying drawing, making part of this specification, and the letters of reference marked thereon.

The object of said invention is to operate and give an intermittent motion automatically to a valve in connection with a steam boiler or generator by the pressure it contains and by the transference of its water or a portion of it, through the agency of its steam and pressure, to and from a receiver in connection with it.

The several parts and combination of parts comprising the invention, as hereinafter stated, may be made and arranged in different forms to accomplish its object, as above stated, without changing its substance.

It is not intended, therefore, to limit the patent of which this is the specification to the arrangement of the combinations or the form of the parts thereof; but it is intended to embrace and include the substance of the combinations and their respective parts by which the object of the invention is accomplished.

The several parts and combination of parts comprising my invention consist, first, of the combination of a hollow lever, a receiver, and a steam-valve with each other, and in connection with a steam boiler or generator, arranged to admit water or steam, or both, from the boiler to the receiver through the lever, and return it to the boiler automatically by opening and closing the valve intermittently through the varying weight of the receiver; second, of the combination of a hollow lever or pipe, a receiver, and a counterbalance, in combination with each other and with a steam boiler or generator, said hollow lever and receiver to be in connection with the water and steam space of the boiler or generator, and arranged with reference to each other and the boiler to admit the water and steam to and from the receiver through the lever, for the purpose of operating the same; third, of an apparatus moved and operated intermittently and automatically, in combination with a steam-boiler, through the agency of steam and water taken from and returned to it, consisting of a pipe or hollow lever, combined with a valve in connection with the boiler, and leading from the water-space of the boiler to the bottom of a receiver fitted with a pipe leading from its top to the steam-space of the boiler, by which an equilibrium of pressure is intermittently established above and below the water in the receiver; fourth, of the combination of a hollow lever, a counter-weight, a receiver, and a steam-valve with each other, and in connection with a steam boiler or generator, arranged to admit water or steam, or both, from the boiler to the receiver, to open and close the valve intermittently by the varying weight of the receiver, occasioned by the alternate flow of the steam and water to and from the boiler, the counterweight being arranged to balance the weight of the receiver; fifth, the means, substantially hereinafter described, of imparting an intermittent motion automatically to a receiver, in combination with a steam-boiler consisting of a valve, a hollow lever or pipe connecting the receiver and boiler, and arranged with reference to each other and the boiler to operate the valve and admit water to the receiver, and expel it by steam from the boiler, and to again admit the water to the receiver by the condensation of the steam left in the receiver after expelling the water, by which a partial vacuum is produced in it.

By the drawing accompanying and making part of this specification are illustrated the devices and their combinations constituting this invention, as above specified.

Reference being had to the figure, A is a steam boiler or generator. *a* is a valve-seat fitted thereto. *b* is a hollow valve fitted in said seat. *f* is a pipe leading from the valve to the boiler. *g* is a pipe or hollow lever applied to the valve, of which *a* is the fulcrum, supported by a standard, *e*.

To the pipe or lever *g* is applied the receiver *h*, in the top of which a cock is fitted. *k* is a counter-weight of the receiver *h* and lever *g*, connected to the valve at *c*. From or near the top of the receiver a pipe, *j*, leads to the steam and water space of the boiler.

In the arrangement above described the lower ends of both pipes *f* and *j* reach below the water-level of the boiler, the pipe *f* extending below the pipe *j*.

By this arrangement of the combination of the devices above described, if the air be blown out of the receiver *h*, and the level of the water be above the ends of both pipes, the pressure in the boiler will force the receiver full of water, and the valve will be retained with a force equal to the weight of the lever and receiver full of water diminished by the effective weight of the counter-balance; but if the water-level in the boiler sink below the end of the pipe *j* the steam establishes an equilibrium of pressure upon the top and bottom of the water in the receiver, which then runs back through the pipe *f* into the boiler. The weight of the receiver being thus lightened, the pressure of the steam against the valve and the weight of the counter-balance raises the receiver and opens the valve. The valve being open and the receiver raised, as above stated, will remain in that position until the level of the water rises above the end of the pipe *j*, and until the steam condenses in the receiver, creating a partial vacuum, when the pressure will again force the water in the receiver, as before, and so on, at once giving notice that the water in the boiler is too low, and motion to the receiver and hollow lever or pipe to which it is applied.

In concluding my description of this invention I desire to say that it is limited to the devices substantially above described, in combination with each other, and with, or in connection with, the boiler or generator, substanstantially as above stated.

As the invention appears by the drawing, it is applied to indicate the height of water in the boiler, and as a safety-valve to "blow off" when the steam reaches a certain pressure; but its use is not limited to this purpose, for it is apparent that the operation of the valve and the motion of the lever, or of the receiver or counter-balance, can be applied to various uses. Thus it may be used to open a valve in connection with a steam-boiler, to start a steam-pump, or to open and close a damper, or work a steam-trap as readily as to open and close a safety-valve.

Having now described my invention, its object and mode of operation, and some of the uses to which it is adapted, I claim—

1. The combination of a hollow lever, a receiver, and a steam-valve with each other, and in connection with a steam boiler or generator, arranged to admit water or steam, or both, from the boiler to the receiver through the lever, and return it to the boiler automatically by opening and closing the valve intermittently through the varying weight of the receiver.

2. The combination of a hollow lever, a receiver, and a counter-balance, in combination with each other and with a steam boiler or generator, said hollow lever and receiver to be in connection with the water and steam space of the boiler or generator, and arranged with reference to each other and the boiler to admit the water and steam to and from the receiver through the lever, for the purpose of operating the same.

3. An apparatus moved and operated intermittently and automatically, in combination with a steam-boiler, through the agency of steam and water taken from and returned to it, consisting of a pipe or hollow lever, combined with a valve in connection with the boiler, and leading from the water-space of the boiler to the bottom of a receiver fitted with a pipe leading from its top to the steam-space of the boiler, by which an equilibrium of pressure is intermittently established above and below the water in the receiver.

4. The combination of a hollow lever, a counter-weight, a receiver, and a steam-valve with each other, and in connection with a steam boiler or generator arranged to admit water or steam, or both, from the boiler to the receiver, and open and close the valve intermittently by the varying weight of the receiver, occasioned by the alternate flow of the steam and water to and from the boiler, the counter-weight being arranged to balance the weight of the receiver.

5. The means, substantially herein described, of imparting an intermittent motion automatically to a receiver, in combination with a steam-boiler consisting of a valve, a hollow lever connecting the receiver and boiler, and arranged with reference to each other and the boiler to operate the valve and admit water to the receiver and expel it by steam from the boiler, and to again admit the water to the receiver by the condensation of the steam left in the receiver after expelling the water, by which a partial vacuum is produced in it.

6. A hollow valve, in combination with a hollow lever, receiver, and steam-boiler, by which the water is made to pass from the boiler through the valve to the hollow lever and receiver.

JOHN ABSTERDAM.

Witnesses:

AMOS BROADNAX,

WILLIAM H. BROADNAX.